(12) United States Patent
Koh

(10) Patent No.: US 6,360,856 B1
(45) Date of Patent: Mar. 26, 2002

(54) DOUBLE-TUBE SHOCK ABSORBER USING A HYDRAULIC FLUID AND A MAGNETORHEOLOGICAL FLUID

(75) Inventor: You-Seok Koh, Kyonggi-Do (KR)

(73) Assignee: Mando Corporation (KR)

( * ) Notice: Subject to any disclaimer, the term of this patent is extended or adjusted under 35 U.S.C. 154(b) by 0 days.

(21) Appl. No.: 09/755,810

(22) Filed: Jan. 5, 2001

(51) Int. Cl.$^7$ ................................ F16F 9/53; F16F 9/22
(52) U.S. Cl. ........................ 188/267.1; 188/315
(58) Field of Search ........................ 188/267, 267.1, 188/267.2, 315

(56) References Cited

U.S. PATENT DOCUMENTS

| | | | | |
|---|---|---|---|---|
| 4,896,752 A | * | 1/1990 | Shtarkman | 188/267.1 |
| 5,284,330 A | | 2/1994 | Carlson et al. | 188/267.1 |
| 5,316,112 A | * | 5/1994 | Kimura et al. | 188/267.1 |
| 5,366,048 A | * | 11/1994 | Watanabe et al. | 188/267.1 |
| 5,956,951 A | | 9/1999 | O'Callaghan | 188/267.1 |

FOREIGN PATENT DOCUMENTS

| | | |
|---|---|---|
| DE | 4200977 | 7/1993 |
| EP | 0607545 | 7/1994 |
| GB | 2267947 | 12/1993 |
| WO | 9927273 | 6/1999 |

* cited by examiner

Primary Examiner—Matthew C. Graham
(74) Attorney, Agent, or Firm—Anderson Kill & Olick, PC

(57) ABSTRACT

A double-tube shock absorber includes an outer cylinder having a first working chamber, an inner cylinder located inside the first working chamber and having a second working chamber, a first piston movably inserted into the first working chamber and a second piston having a coil and movably inserted into the second working chamber. The first and the second working chamber are filled with a hydraulic fluid and a magnetorheological (MR) fluid, respectively. The first and the second piston have one or more orifices, respectively. The double-tube shock absorber further includes one or more first piston rods for leading the first piston in a reciprocating motion and a second piston rod for leading the second piston in a reciprocating motion. The double-tube shock absorber can sensitively respond to the impulse applied thereto by using the hydraulic fluid having relatively low viscosity and, at the same time, can modulate the damping force by using the MR fluid having changeable viscosity.

12 Claims, 5 Drawing Sheets

DOUBLE-TUBE SHOCK ABSORBER USING A HYDRAULIC FLUID AND A MAGNETORHEOLOGICAL FLUID

FIELD OF THE INVENTION

The present invention relates to a shock absorber for use in a motor vehicle; and, more particularly, to a double-tube shock absorber using a magnetorheological (MR) fluid and a hydraulic fluid.

BACKGROUND OF THE INVENTION

Typically, motor vehicles are equipped with a suspension system to improve road-adherence and to provide ride-comfort for occupants. The suspension system includes springs and shock absorbers. The shock absorbers are disposed in parallel with the springs to damp the vibration of the springs.

The shock absorbers utilize a fluid flow system incorporating therein either a hydraulic fluid having a constant viscosity or a fluid having a changeable viscosity, e.g., magnetorheological (MR) fluid. The use of MR fluid is advantageous in that the viscosity thereof can be controlled with the application of a magnetic field in order to adjust a damping force being exerted on the springs depending on a traveling condition.

Particularly, MR fluid is a free-flowing liquid with a viscosity. Exposure to a magnetic field can transform the liquid into a near-solid in milliseconds; and with the removal of the magnetic field, the fluid can be returned to its liquid state just as quickly. The degree of change in the viscosity of the MR fluid is proportional to the magnitude of the applied magnetic field.

FIGS. 1 and 2 are a cross sectional view illustrating a conventional shock absorber using an MR fluid and an enlarged cross sectional view depicting a piston assembly shown in FIG. 1, respectively, disclosed in U.S. Pat. No. 5,284,330 entitled "MAGNETORHEOLOGICAL FLUID DEVICE" issued on Jan. 11, 1994.

The shock absorber 10 comprises two principal components: a housing 20 and a piston assembly 30. The housing 20 includes a volume of magnetorheological (MR) fluid. The fluid includes carbonyl iron particles suspended in silicone oil.

The housing 20 is generally of a cylindrical tube with a first closed end 22. A cylindrical sleeve 25 may be affixed to an inner cylinder by any conventional means, e.g., press fit, welding or adhesive to increase the cross-sectional surface area of the housing 20. The cylinder is closed at a second end thereof by an end member 26. A first seal 27 extends about an outer periphery of the end member 26 to prevent fluid leakage between the housing 20 and the end member 26. A second annular seal 28 is housed in a groove in an inner periphery of the end member 26 and seals against a piston rod 32. A scraper 29 can be used to wipe the MR fluid off the surface of piston rod 32 so as to minimize the loss of MR fluid past the second annular seal 28.

The housing 20 is provided with a floating piston 21 to separate the MR fluid from a pressurized accumulator 23. The pressurized accumulator 23 is necessary to accommodate a fluid displaced by the piston rod 32 as well as to allow for thermal expansion of the fluid.

The piston assembly 30 is shown in greater detail in FIG. 2. A piston head 34 is spool shaped with an upper outwardly extending flange 36 and a lower outwardly extending flange 38. A coil 40 is wound upon the spool-shaped piston head 34 between the upper flange 36 and the lower flange 38. The piston head 34 is made of a magnetically permeable material, such as low carbon steel. Guide rails 42 are attached around an outside of the piston head 34 at particular intervals. As shown in FIGS. 1 and 2, four guide rails 42 are shown spaced uniformly about a periphery of the piston head 34.

An electrical connection is made to the coil 40 through the piston rod 32 by lead wires 45 and 47. The first lead wire 45 is connected to a first end of an electrically conductive rod 48 which extends through the piston rod 32 to a Phono-jack connector 46. A center connection of the Phono-jack 46 is connected to a first end 39 of the coil 40. A second end 41 of windings of the coil 40 is attached to a "ground" connection on an outside of the Phono-jack 46. An electrical return path, then, includes the piston rod 32 and the ground lead 47.

However, such an MR shock absorber has some inherent drawbacks. First, since the MR fluid has a higher viscosity than the conventional hydraulic fluid even in the absence of a magnetic field, the MR shock absorber tends to exert a harder damping force against external forces applied thereto, resulting in a deteriorated ride-comfort under certain circumstances. Furthermore, the MR fluid is costly, increasing the manufacturing cost of the shock absorber.

SUMMARY OF THE INVENTION

It is, therefore, an object of the present invention to provide a double-tube shock absorber using a magnetorheological fluid and a hydraulic fluid.

In accordance with the present invention, there is provided a double-tube shock absorber comprising: an outer cylinder having a first working chamber; an inner cylinder located inside the first working chamber and having a second working chamber, wherein the first and the second working chamber are filled with a hydraulic fluid and a magnetorheological fluid, respectively; a first piston movably inserted into the first working chamber; a second piston having a coil movably inserted into the second working chamber, wherein each of the pistons includes one or more orifices; one or more first piston rods for leading the first piston in a reciprocating motion; and a second piston rod for leading the second piston in a reciprocating motion.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
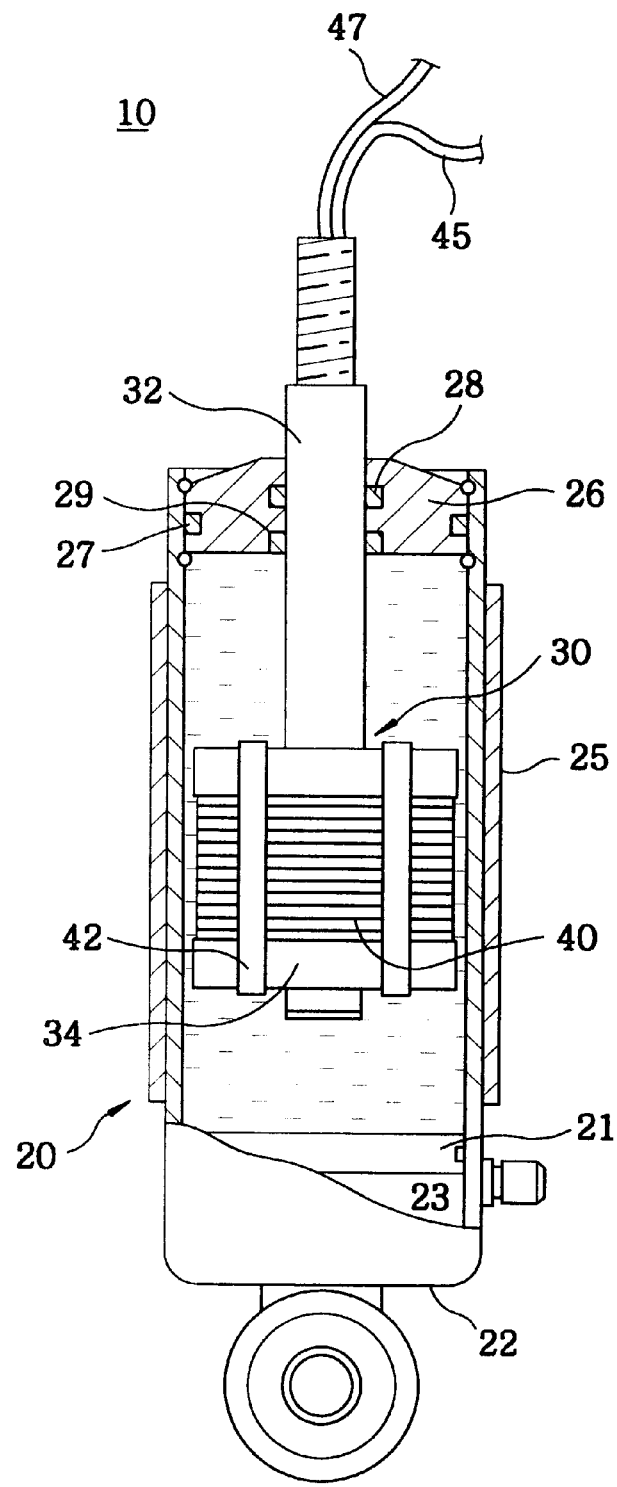
FIG. 1 is a schematic cross sectional view illustrating a shock absorber using a magnetorheological fluid previously disclosed.
Figure 2:
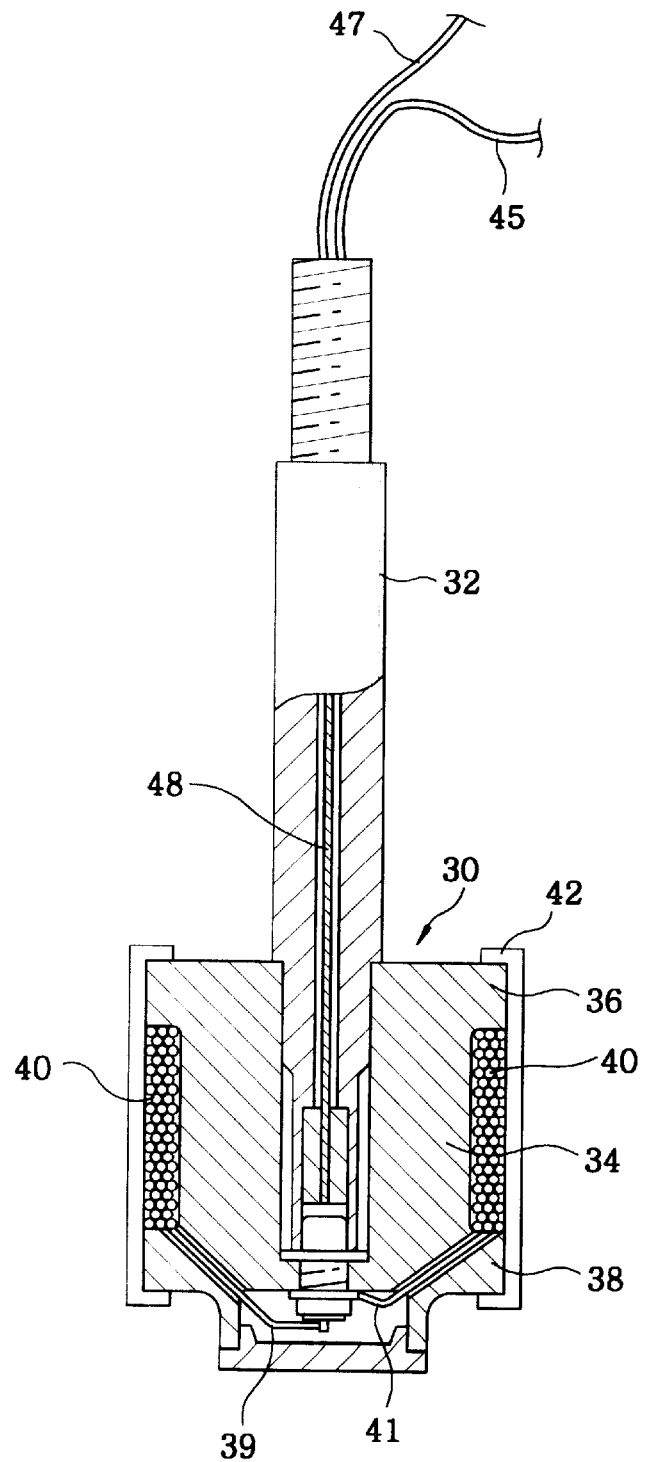
FIG. 2 shows an enlarged cross sectional view illustrating a piston assembly incorporated in the shock absorber shown in FIG. 1.
Figure 3:
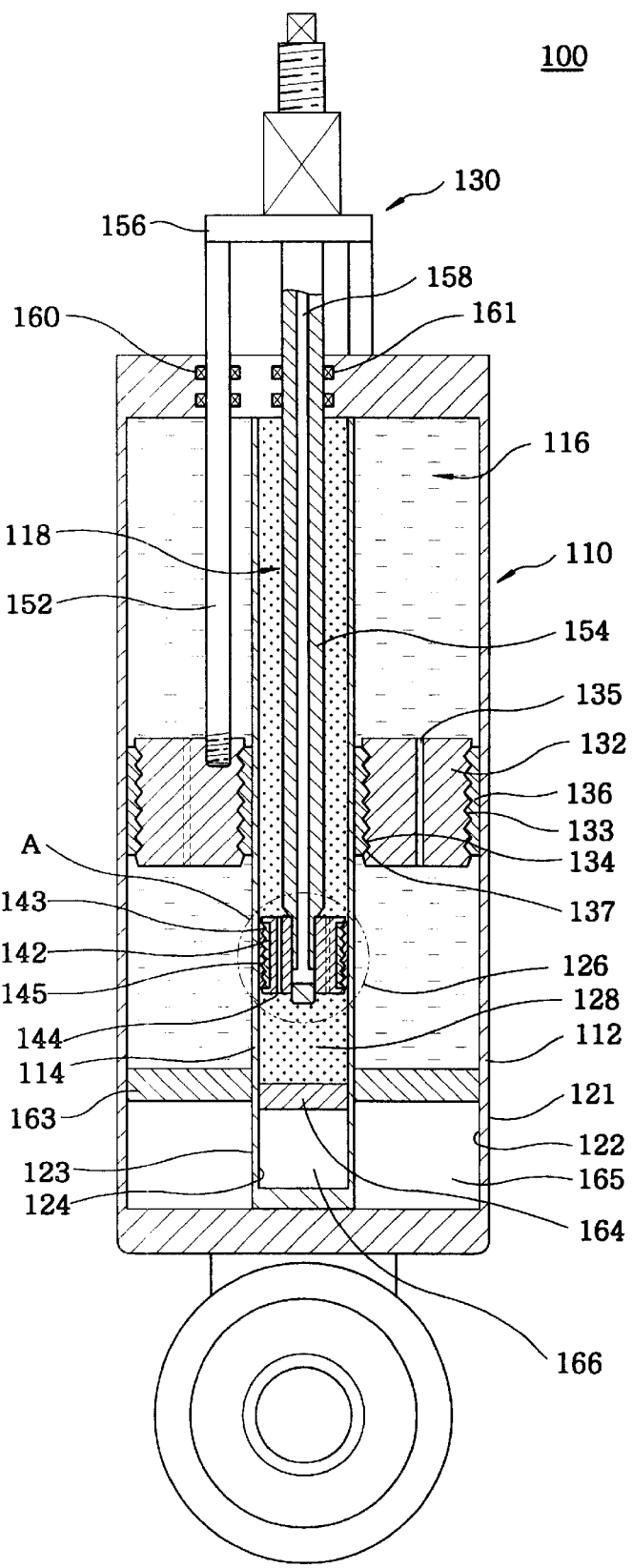
FIG. 3 offers a schematic cross sectional view depicting a double-tube shock absorber using both a magnetorheological fluid and a hydraulic fluid in accordance with the present invention.

An inventive double-tube shock absorber 100 for using in a vehicle, e.g., automobile, comprises a cylinder assembly 110 and a piston assembly 130, as shown in FIG. 3.

The cylinder assembly 110 is provided with an outer cylinder 112 including an outer and an inner surface 121, 122, and an inner cylinder 114 having an outer and an inner surface 123, 124. The outer cylinder 112 incorporates therein a first working chamber 116. The inner cylinder 114 is located inside the first working chamber 116 and incorporates therein a second working chamber 118. The first and the second working chamber 116, 118 are filled with a hydraulic fluid 126 having a constant low viscosity and a magnetorheological (MR) fluid 128 having a changeable viscosity, respectively. The first and the second working chamber 116, 118 are isolated from each other for preventing the hydraulic fluid 126 and the MR fluid 128 from interflowing therebetween.

Figure 4:
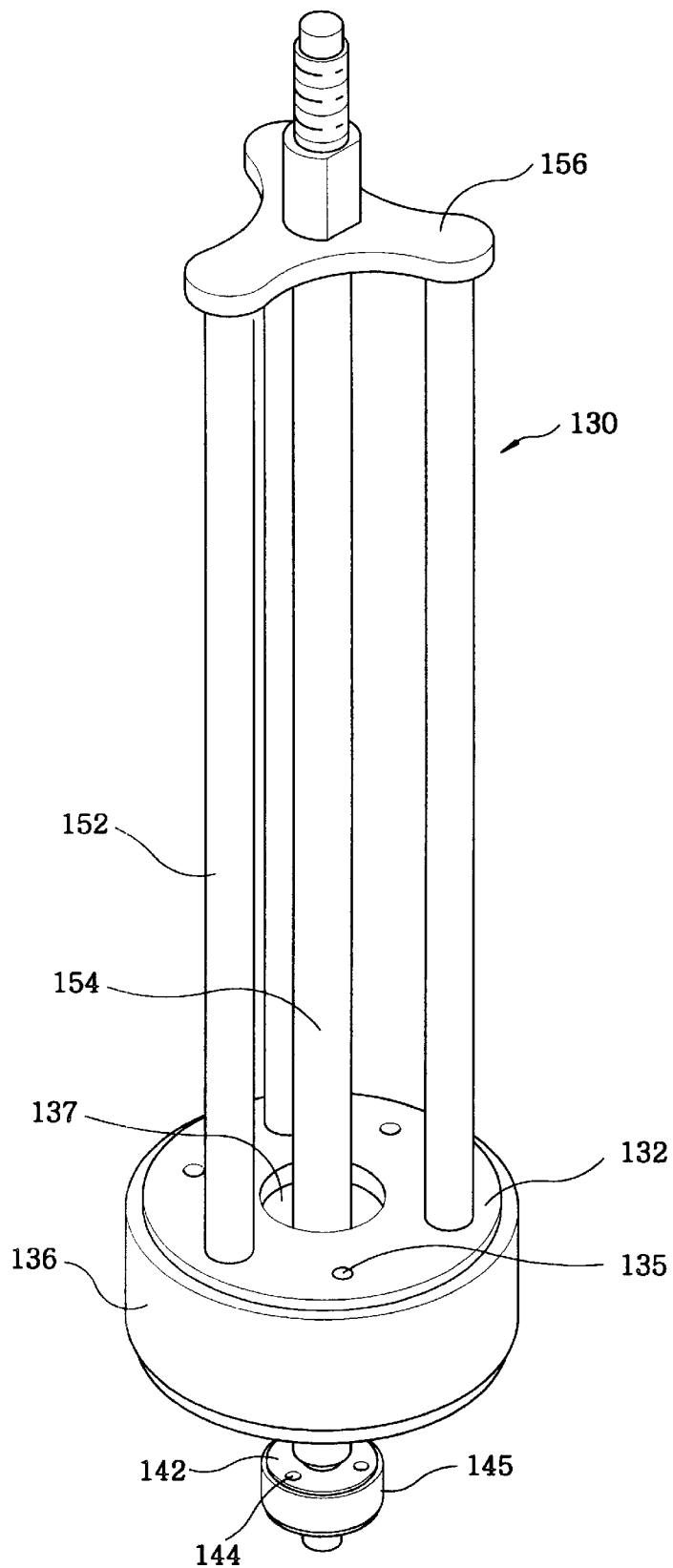
FIG. 4 represents a perspective view portraying piston assembly incorporated in the double-tube shock absorber shown in FIG. 3.

As shown in FIGS. 3 and 4, the piston assembly 130 is provided with a first piston 132, a second piston 142, three of first piston rods 152, a second piston rod 154 and a rod fixture 156, as shown in FIG. 4.

The first piston 132 having an outer and an inner periphery 133, 134 is movably inserted into the first working chamber 116 with horizontally adjoining its outer periphery 133 to the inner surface 122 of the outer cylinder 112 and its inner periphery 134 to the outer surface 123 of the inner cylinder 114. The first piston 132 includes three of first orifices 135 for providing vertical flowing paths for the hydraulic fluid 126 in the first working chamber 116. The first piston 132 further includes a first and a second sealing member 136, 137 made of, e.g., Teflon or the like, wherein the first and the second sealing member 136, 137 are secured on the outer periphery 133 and on the inner periphery 134 of the first piston 132, respectively, for preventing the hydraulic fluid 126 from flowing along with the outer and the inner periphery 133, 134 of the first piston 132, respectively.

The second piston 142 having an outer periphery 143 is movably inserted into the second working chamber 118 with horizontally adjoining its outer periphery 143 to the inner surface 124 of the inner cylinder 114. The second piston 142 includes three of second orifices 144 for providing vertical flowing paths for the MR fluid 128 in the second working chamber 118. The second piston 142 further includes a third sealing member 145 made of, e.g., Teflon or the like, and secured on the outer periphery 143 for preventing the MR fluid 128 from flowing along with the outer periphery 143 of the second piston 142.

Although the number of the orifices 135 and that of the orifices 144 are preferably three, respectively, in the above description, the present invention is not limited thereto. Depending on the maximum amount of damping force required to the double-tube shock absorber 100 of the present invention, one or more first and second orifices 135, 144 can be formed in the first piston 132 and the second piston 142, respectively.

Figure 5:
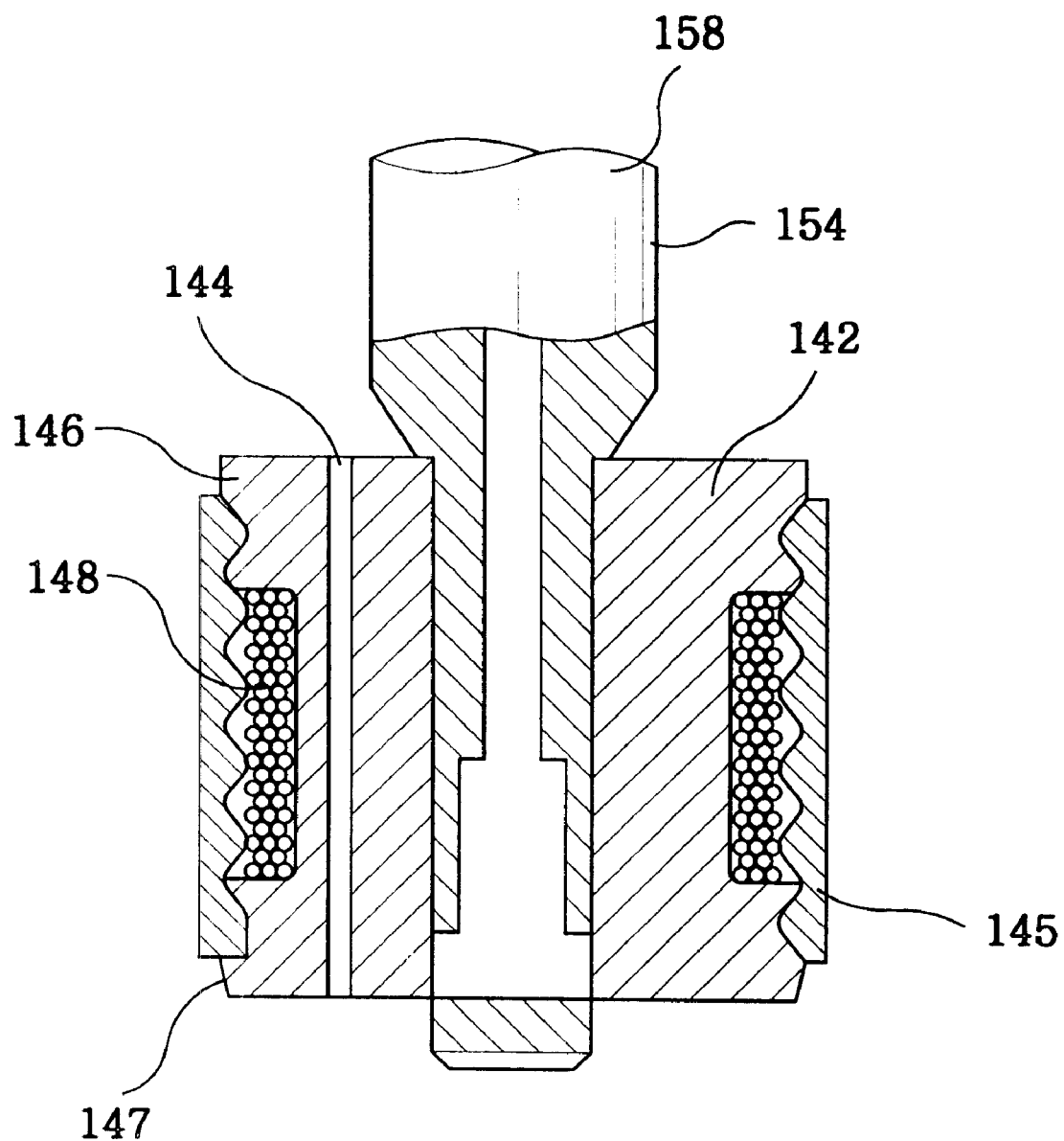
FIG. 5 provides an enlarged cross sectional view of a portion "A" shown in FIG. 3.

As shown in FIG. 5, the second piston 142 is structured for forming a magnetic field generator, e.g., solenoid, in such a way that the second piston 142 is shaped as a spool having an upper and a lower flange 146, 147, and is made of a magnetic permeable material, e.g., ferrite, low-carbon steel or the like, and further is convolved with a coil 148 at the outer periphery 143 thereof between the upper and the lower flange 146, 147. Accordingly, when an electrical current is applied to the coil 148, a magnetic field is generated around the second piston 142, which will, in turn, change the viscosity of the MR fluid 128 passing through the second orifices 144.

Returning to FIGS. 3 and 4, three of the first piston rods 152 for leading the first piston 132 in a reciprocating motion are rigidly joined to the first piston 132 at one end thereof. While the number of the first piston rods 152 is preferably three in the above description, the present invention is not limited thereto. Considering various mechanical factors, e.g., balance, tensile force, compressive force or the like, charged to the first piston rods 152, one or more first piston rods 152 can be rigidly joined to the first piston 132.

The second piston rod 154 for leading the second piston 142 in a reciprocating motion is rigidly joined to the second piston 142 at one end thereof The second piston rod 154 includes an interior cavity 158 where electrical connections (not shown) for applying the electric signal to the coil 148 are installed.

Another opposite ends of the first piston rods 152 and the second piston rod 154 are secured to the rod fixture 156 in such a way that the reciprocating motions of the first piston 132 and the second piston 142 are dependent on and coincident to each other during the operation of the double-tube shock absorber 100.

The double-tube shock absorber 100 further comprises a number of first and second sealing parts 160, 161, a first and a second floating piston 163, 164 and a first and a second accumulator 165, 166. The first and second sealing parts 160, 161, respectively, prevent the hydraulic fluid 126 and the MR fluid 128 from leaking along with the first piston rods 152 and the second piston rod 154, respectively. The first and the second floating piston 163, 164 are movably inserted into the outer cylinder 112 and the inner cylinder 114, respectively. Each of the accumulator 165, 166 is filled with a gas, e.g., nitrogen, wherein the first and the second accumulator 165, 166 are, respectively, necessary to accommodate the hydraulic and the MR fluid 126, 128 displaced by the first piston rods 152 and the second piston rod 154 as well as to allow for thermal expansion of the hydraulic and the MR fluid 126, 128.

As may be seen from the above, it should be appreciated that the double-tube shock absorber 100 of the present invention utilizes both the hydraulic fluid 126 in the first chamber 116 and the MR fluid 128 in the second chamber 118. Accordingly, the double-tube shock absorber 100 can sensitively respond to the impulse applied thereto by using the hydraulic fluid 126 having relatively low viscosity and, at the same time, can modulate the damping force by using the MR fluid 128 having adjustable viscosity in consideration with various factors, e.g., driving conditions, driver's controls and so on. Furthermore, the expensive MR fluid 128 is employed in only the second working chamber 118 of the inner cylinder 114, thereby reducing the amount of the MR fluid 128 needed and, hence, reducing the manufacturing cost of the double-tube shock absorber 100.

While the present invention has been shown and described with respect to the particular embodiments, it will be apparent to those skilled in the art that many changes and modifications may be made without departing from the spirit and scope of the invention defined in the appended claims.

What is claim is:

1. A double-tube shock absorber comprising:
   an outer cylinder having a first working chamber;
   an inner cylinder located inside the first working chamber and having a second working chamber, wherein the first and the second working chamber are filled with a hydraulic fluid and a magnetorheological (MR) fluid, respectively;
   a first piston movably inserted into the first working chamber;
   a second piston convolved by a coil and movably inserted into the second working chamber, wherein the first and the second piston include one or more orifices, respectively;

one or more first piston rods for leading the first piston in a reciprocating motion; and a second piston rod for leading the second piston in a reciprocating motion.

2. The shock absorber of claim 1, wherein the first and the second working chamber are isolated from each other for preventing the hydraulic fluid and the MR fluid from interflowing therebetween.

3. The shock absorber of claim 1, wherein the first piston is provided with an outer and an inner periphery and includes a first and a second sealing member, the first and the second sealing member being secured on the outer periphery and on the inner periphery, respectively, for preventing the hydraulic fluid from flowing along with the outer and the inner periphery of the first piston.

4. The shock absorber of claim 1, wherein the second piston is provided with an outer periphery and includes a third sealing member secured on the outer periphery for preventing the MR fluid from flowing along with the outer periphery of the second piston.

5. The shock absorber of claim 1, wherein the second piston is structured to form a magnetic field generator, wherein the second piston is made of a magnetic material and is convolved with the coil at an outer periphery thereof.

6. The shock absorber of claim 1 further comprising a rod fixture rigidly holding thereon the first and the second piston rod at once in such a way that the reciprocating motions of the first and the second piston are dependent on and coincident to each other.

7. The shock absorber of claim 1 further comprising a number of sealing parts for preventing the hydraulic fluid and the MR fluid from leaking along with the first piston rod and the second piston rod.

8. The shock absorber of claim 1, wherein the second piston rod includes an interior cavity through which an electrical current is applied to the coil.

9. The shock absorber of claim 1 further comprising a first and a second floating piston movably inserted into the outer and the inner cylinder, respectively.

10. The shock absorber of claim 9 further comprising a first and a second accumulator filled with a gas, wherein the first and the second accumulator are installed in the outer and inner cylinder, respectively.

11. A motor vehicle incorporating therein the double-tube shock absorber according to claim 1.

12. A suspension system incorporating therein the double-tube shock absorber according to claim 1.

* * * * *